US012059625B2

(12) United States Patent
Fear

(10) Patent No.: US 12,059,625 B2
(45) Date of Patent: Aug. 13, 2024

(54) PLAYSTYLE ANALYSIS FOR GAME RECOMMENDATIONS

(71) Applicant: NVIDIA Corporation, Santa Clara, CA (US)

(72) Inventor: Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 339 days.

(21) Appl. No.: 17/545,918

(22) Filed: Dec. 8, 2021

(65) Prior Publication Data

US 2023/0177583 A1 Jun. 8, 2023

(51) Int. Cl.
*A63F 13/79* (2014.01)
*G06Q 30/0601* (2023.01)

(52) U.S. Cl.
CPC ......... *A63F 13/79* (2014.09); *G06Q 30/0631* (2013.01); *A63F 2300/5546* (2013.01)

(58) Field of Classification Search
None
See application file for complete search history.

(56) References Cited

U.S. PATENT DOCUMENTS

| 2012/0142429 A1* | 6/2012 | Muller | A63F 13/69 463/42 |
| 2018/0012238 A1* | 1/2018 | Giannuzzi | G06Q 30/0203 |
| 2021/0232627 A1* | 7/2021 | Schuckle | G06F 16/90348 |
| 2021/0402292 A1* | 12/2021 | Chow | A63F 13/285 |
| 2023/0030842 A1* | 2/2023 | Karp | A63F 13/34 |

FOREIGN PATENT DOCUMENTS

DE 10349607 A1 7/2004

OTHER PUBLICATIONS

Fear, Andrew; First Office Action for German Patent Application No. 10 2022 132 167.3, filed Dec. 5, 2022, mailed Nov. 2, 2023, 12 pgs.

* cited by examiner

*Primary Examiner* — Jason T Yen
(74) *Attorney, Agent, or Firm* — Taylor English Duma L.L.P.

(57) ABSTRACT

In various examples, data representing user interactions with a plurality of games are analyzed to generate an aggregate playstyle profile for each game. The aggregate playstyle profiles of games participated in a by a user may be used to recommend one or more other games with a similar aggregate playstyle profile. In embodiments, an individual user's playstyle patterns may be used to determine games having similar playstyle profiles to eh user's playstyle patterns. In this way, game recommendations are more tailored to a particular type of gameplay, and not only to particular genres of games or games that are currently the most popular.

20 Claims, 12 Drawing Sheets

PLAYSTYLE ANALYSIS FOR GAME RECOMMENDATIONS

BACKGROUND

Game streaming services and gaming retailers often provide recommendations to players suggesting other game titles that the players may be interested in purchasing, downloading, and/or playing. By providing recommendations to players, game providers can bring a wider audience of players to games available in their game catalog or service. For example, a game provider may increase customer exposure to a new game by providing recommendations suggesting the new game to players. Game recommendations may also provide users with information regarding particular games and titles that they otherwise may not have discovered on their own. In various scenarios, it may be desirable to provide game recommendations to players that correspond to the players' particular tastes and preferences. For example, a player may be more interested in other games that share attributes in common with a game that the player may already play or enjoy.

Conventionally, game recommendation systems have placed a large importance on the genre or popularity (e.g., sales, downloads, etc.) of a game when providing a recommendation for that game. For example, a list of the most popular games in a particular genre (e.g., action, adventure, strategy, sports, etc.) may be provided as a recommendation. In other approaches, aspects such as the game developer, game publisher, and/or keyword or tags associated with a game may be used to provide recommendations for games that share similarities to another game (e.g., a game owned, or previously played by a user). However, basing game recommendations on popularity or static characteristics like genre or keyword may result in non-specific and possibly less relevant game recommendations for a particular user since a user-specific playstyle is not taken into account. For example, based on a user's previous purchase of a game categorized into a particular genre (e.g., adventure) another game that is categorized into that same genre may be recommended, even though the two games may lack similarity with respect to the playstyle and/or gameplay typical to each respective game.

SUMMARY

Embodiments of the present disclosure relate to playstyle analysis for game recommendations. Systems and methods are disclosed that analyze the interactions of a user within a game to determine a playstyle associated with the user that may be used to recommend other games—e.g., based on identifying a similar playstyle of other players of the other games. Further, systems and methods are disclosed that analyze playstyle patterns associated with a particular game played by a user with playstyle patterns associated with one or more other games in order to generate game recommendations.

In contrast to conventional approaches that rely solely on keywords, tags, popularity, reviews, genre, and/or the like for game recommendations, the present disclosure relates to systems and methods that factor in playstyles or play types for particular games in addition to or alternatively from keywords, tags, popularity, reviews, genre, etc. For example, game recommendations may be generated by capturing and analyzing a user's interaction with a game to determine a playstyle for the user for that game such that other games commonly associated with a similar playstyle type (e.g., fast-paced, slow-paced, twitchy, calm, high-skill, etc.) are recommended to the user. For example, a user's interaction with a game may be analyzed to determine that the user has a relatively relaxed, methodical, or contemplative playstyle (e.g., represented by less frequent inputs to an input device(s)) relative to other users of the game, and consequently may be provided with recommendations for other games that have been identified as also having a similar playstyle. In other embodiments, in addition to or alternatively from considering an individual user's playstyle, a playstyle associated with a particular game may be used to determine other games that have a similar playstyle. For example, if a majority of users play a first game with a fast-paced playstyle, then a second game associated with fast-paced playstyles may be recommended. As a result, a user may not be presented only with games of similar genre, popularity, keywords, tags, and/or the like, but may also be presented with recommendations at a more granular level that factor in the way the particular user plays games.

BRIEF DESCRIPTION OF THE DRAWINGS

The present systems and methods for playstyle analysis for game recommendations are described in detail below with reference to the attached drawing figures, wherein.

DETAILED DESCRIPTION

Figure 1:
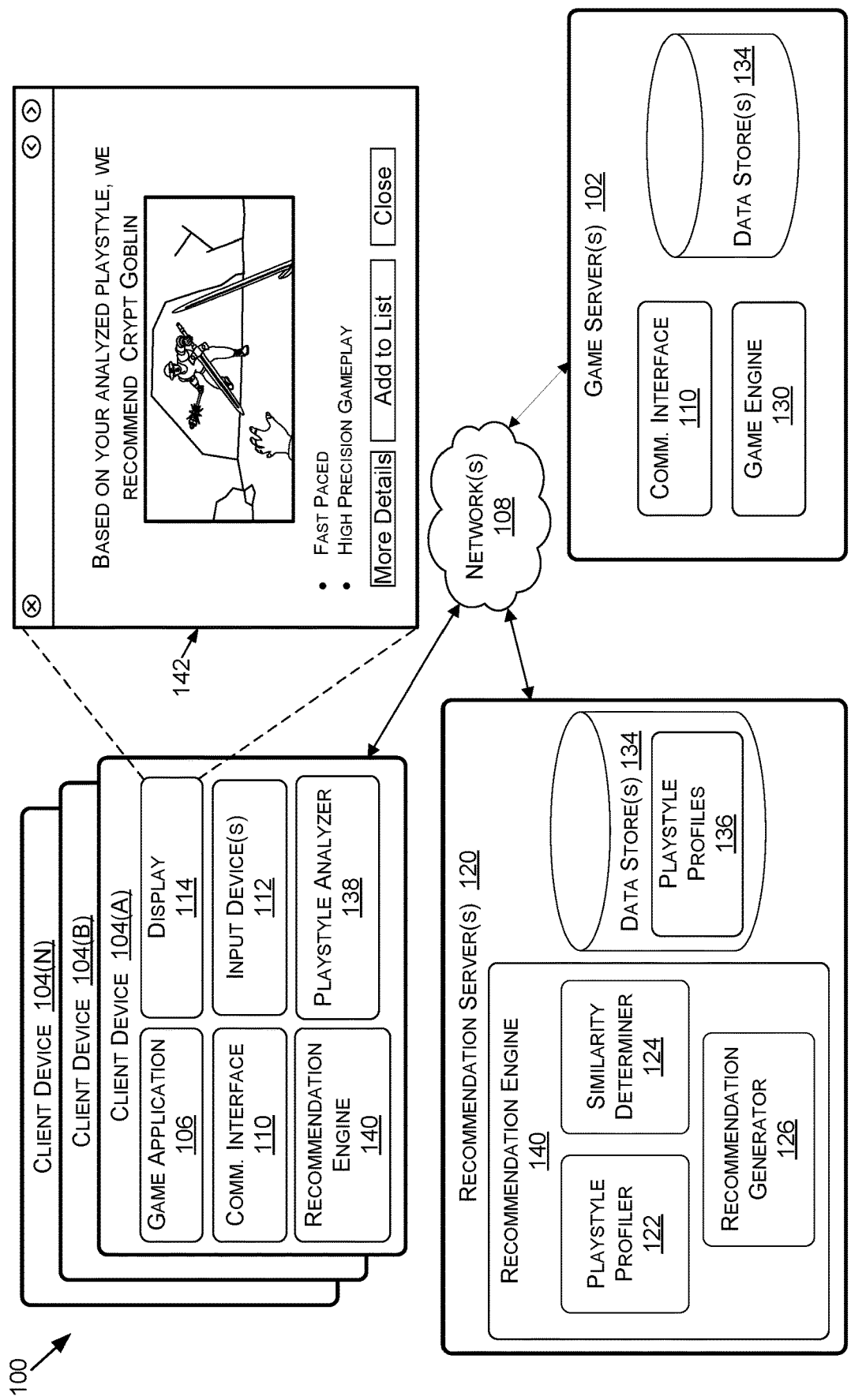
FIG. 1 is an example system diagram of a gameplay analysis and game recommendation system a content item identification and presentation system, in accordance with some embodiments of the present disclosure.

Systems and methods are disclosed related to playstyle analysis for game recommendations. The recommendations described herein may be related to streaming content, local content, or a combination thereof. In addition, the video game recommendations may correspond to computer games, console-based games, virtual reality (VR) games, augmented reality (AR) games, mixed reality (MR) games, and/or other game types. Although the present disclosure is described primarily with respect to video games, this is not intended to be limiting. For example, the systems and methods described herein may be used for software recommendations, video recommendations, and/or other types of content recommendations without departing from the scope of the present disclosure.

Systems and methods are disclosed that provide approaches for generating game recommendations by capturing and analyzing a user's interaction with a game to determine a playstyle for the user for that game such that other games may be determined to have a similar playstyle (e.g., fast-paced, slow-paced, twitchy, calm, high-skill, etc.) and may be recommended to the user. In embodiments, the playstyle of a game may refer to the aspects of a game that relate to how a player interacts with a game independent of a genre or category of a game—although genre and category may still be considered, in embodiments. In further examples, the playstyle may represent the speed, response time, pace, control schemes, skill level, game rules, and/or any behavior associated with the gameplay of a game.

In contrast to conventional approaches, a user's interaction with a game may be analyzed to determine a playstyle for that user. For example, a user's interactions in a first game may be used to determine that the user has a relatively relaxed (or methodical, or contemplative) playstyle (e.g., represented by less frequent inputs to an input device(s)) relative to other users of the game, and consequently may be provided with recommendations for other games that have been identified as also having a relaxed playstyle.

In one or more embodiments, data representative of user interactions with a first game may be generated. For example, data may be generated by capturing user interactions (e.g., mouse movement, camera movement, eye movement, keystrokes, controller movement, button press frequency, etc.) corresponding to any of a number of users (e.g., players of a game) for a particular game. Data representative of user interactions with a game may be generated by the game (e.g., game data log, game application programming interface (API), game state data, etc.). In some examples, data representative of user interactions with a game may be associated with user inputs to one or more input devices (e.g., mouse, keyboard, controller, virtual reality (VR), augmented reality (AR), or mixed reality (MR) headset, etc.). For example, data indicating the speed, frequency, and/or direction of a user's mouse or cursor input may be used to generate data representative of a user's interactions with a game.

In some examples, generating data representative of user interactions with a game may include analyzing video data corresponding to a game. For instance, a change in pixel values included in video data may be analyzed to generate data representative of user interaction with a game. In some examples, the video data may be analyzed and associated with one or more user inputs. For example, timestamps associated with video data may be analyzed to determine user inputs corresponding to particular video frames of the video data.

Once a data representation of user interactions with a game has been generated, a game playstyle profile may be generated. The game playstyle profile may include data corresponding to the playstyle for any of a number of distinct users. For example, the game playstyle profile may be generated to include data representative of playstyles for any number (e.g., hundreds, thousands, etc.) of users for a particular game, and a game playstyle profile may be generated for any of a number of games. The game playstyle profile may include one or more playstyle attributes for the game. For example, a playstyle attribute may be a value, parameter, and/or distribution that indicates the playstyle of the users associated with the user interactions. As an example, a playstyle attribute may indicate that 85% of the players of a particular game move their input devices an average distance of 100 pixels per second, or that some percentage of the pixels are changed from frame to frame on average (e.g., where a larger percentage indicates a more twitchy or fast-paced playstyle and a smaller percentage indicates a more slow-paced playstyle). As a further example, a playstyle attribute may be represented using a histogram, probability distribution function (PDF), and/or cumulative distribution function (CDF) that represents how a set of users has interacted with a game. For example, a playstyle attribute may indicate that 50% of a game's players provide a mouse-click input between 10 and 35 times per minute. In some examples, the data representative of user interactions with a game can be provided to a machine learning model—e.g., neural network—to generate a game playstyle profile.

Once an aggregate game playstyle profile has been generated for a particular game, the profile can be compared to a user's personal playstyle corresponding to a different game to determine a similarity between the two playstyles. The user playstyle corresponding to a different game may be determined using the methods described above with respect to capturing and analyzing data representative of user interactions with a game. For example, a user playstyle may be determined with respect to a first game and then compared to the aggregated game playstyle profiles associated with a set of other games, to identify which games of the set of other games may share a similar style of play to user's playstyle as exhibited during playthrough of the first game. As an example, a user may play a first game and have an average movement speed of 500 pixels per second. In such an example, using the game's aggregated playstyle profiles of other games, games in which 80% (e.g., $80^{th}$ percentile) of other users have an average movement speed of 500 pixels per second may be determined to have a similar playstyle to the user. In some embodiments, a similarity score indicating the similarity between a game's aggregate playstyle profile and a user playstyle can be calculated. For example, the similarity score may be based on comparing a first data representative of a user interactions with a first game (e.g., a player of the first game) to a second data representative of user interactions with a second game (e.g., a plurality of players of the second game). In some examples, the similarity score may be calculated using a machine learning model trained to determine the similarity between a game playstyle profile and a user playstyle. In some embodiments, the similarity score may be based solely on data representative of user interactions with a game, while in some embodiments, the similarity score may be based on a combination of the data representative of user interactions with a game and associated game attributes such as genre, keywords, console compatibility, aesthetic, age rating, content rating, etc.

In some embodiments, the similarity score may be used to provide one or more game recommendations to a user. For example, based on determining similarity scores between a user playstyle and the aggregate game playstyle profiles of each game of a set of other games, a game of the set of other games which has an aggregate game playstyle profile most similar to the user playstyle may be provided to the user as a recommended game. In some embodiments, a game recommendation may be provided to a user based on determining a similarity between the aggregate playstyle profile for a game that the user has played and the aggregate playstyle profiles of other games. In some examples, multiple games may be recommended to the user based on the similarity scores of the games. An indication may be provided to the user in association with a game recommendation, which indicates that based on their detected playstyle, one or more games have been identified as candidates for having a similar playstyle. For example, a message or graphical element may indicate to the user that since their playstyle was identified as "fast-paced and twitchy," they may enjoy these other games for which a significant number of other players were identified with a "fast-paced and twitchy" playstyle. In some embodiments, games corresponding to a similarity score that is greater that a threshold similarity value may be recommended to a user. As such, game recommendations may be provided to a user that most closely match the user's playstyle. In this way, user-specific recommendations can be provided to the user, resulting in higher relevance and more accurate game suggestions.

With reference to FIG. 1, FIG. 1 is an example system diagram of a gameplay analysis and game recommendation system 100 (also referred to as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar features, functionality, and/or components as example content streaming system 1000 of FIG. 10, example computing device 1100 of FIG. 11, and/or example data center 1200 of FIG. 12.

The system 100 may include, among other things, one or more client devices 104(A), 104(B), and 104(N) (referred to collectively herein as "client devices 104"), game server(s) 102, and/or a recommendation server(s) 120. Depending on the current embodiment or implementation, there may be any number of client devices 104. The client devices 104 may include a game application 106, a playstyle analyzer 138, a recommendation engine 140, a communication interface 110, an input device(s) 112, and/or a display 114. Although only a few components and/or features of the client device 104 are illustrated in FIG. 1, this is not intended to be limiting. For example, the client devices 104 may comprise additional or alternative components, such as those described below with respect to the computing device 1100 of FIG. 11.

Components of the system 100 may communicate over a network(s) 108. The network(s) 108 may include a wide area network (WAN) (e.g., the Internet, a public switched telephone network (PSTN), a cellular network, etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), and/or another network type. In any example, each of the components of the system 100 may communicate with one or more of the other components via one or more of the network(s) 108.

The client devices 104 may include a smart phone, a laptop computer, a tablet computer, a desktop computer, a wearable device, a game console, a VR, AR, and/or MR system (e.g., a headset, a computer, a game console, remote(s), controller(s), and/or other components), an NVIDIA SHIELD, a smart-home device that may include an intelligent personal assistant, and/or another type of device capable of supporting gameplay of games.

A game application 106 may be a mobile application, a computer application, a console application, a web browser application, a game streaming platform application, and/or another type of software application or service. In some embodiments, multiple applications 106 may be employed. For example, the user interface 142 of FIG. 1 may be displayed in one application and the GUI 500 of FIG. 5 may be displayed in another game application 106. A game application 106 may include instructions that, when executed by a processor(s), cause the processor(s) to, without limitation, receive input data representative of user inputs to the one or more input device(s) 112, transmit the input data to the game server(s) 102 and/or the recommendation server(s) 120, in response receive a game recommendation from the game server(s) 102 and/or the recommendation server(s) 120 using the communication interface 110, and cause display of the game recommendation on the display 114. In other words, the game application 106 may operate as a facilitator for enabling the streaming of gameplay, game libraries, recommendations, and/or other content associated with the game application on the client devices 104. In some examples, the game application 106 may receive game recommendations (e.g., game recommendation data) from the recommendation server(s) 120 using the communication interface 110, and may cause display of game recommendations on the display 114—such as user interface 142. In some examples, the game application 106 may determine how, when, and/or where to display game recommendations.

In some examples, the client devices 104 may use the game application 106 to display the gameplay video and/or game recommendations on the display 114. In some examples, a first client device, such as the client device 104(A), may display the video while a second client device, such as client device 104(B), may present information associated with the content item(s) identified in the video. In examples where the display data is received by the client device 104, the system 100 may be part of a game streaming system, such as the content streaming system 1000 of FIG. 10, described in more detail below.

The playstyle analyzer 138 may comprise one or more components and features for analyzing the playstyle of a user in association with a one or more games. For example, the playstyle analyzer 138 may analyze the playstyle of a user by capturing data representing the user's interactions with a particular game. In some embodiments, the playstyle analyzer 138 may capture user interaction with one or more input device(s) 112, such as by capturing data representing mouse movement, camera movement, eye movement, keystrokes, controller movement, button press frequency, etc. The data representing user interactions with the game may represent the player/camera movement or speed, response time, pace, control schemes, skill level, game rules, interest in interacting with objects in a virtual environment, reading speed, and/or any behavior associated with the gameplay of a game. For example, playstyle analyzer 138 may capture data such as number of pixels moved in a certain period of time (e.g., pixels/second), rate of pixel changes, input frequency, input velocity, type of input, spatial movement of user inputs relative to the game display, and/or any other measurements, metrics, or data suitable for characterizing the playstyle of a user for a particular game. In some embodiments, the user interactions with a particular game can be captured within the game and accessed by the playstyle analyzer 138. For example, the playstyle analyzer 138 may access a game's log data or other event timestamps, or make API calls to determine user interactions with the game.

In some examples, the playstyle analyzer 138 may generate data representative of user interactions with a game by analyzing video data corresponding to the game. For instance, a change in pixel values included in video data of the game application 106 may be analyzed to generate data representative of user interactions with the game corresponding to the game application 106. In some examples, the video data may be analyzed and associated with one or more of the user inputs from one or more of the input device(s) 112. For example, timestamps associated with video data may be analyzed to determine user inputs corresponding to particular video frames of the video data. In some embodiments, the video frames of the video data may be analyzed to determine time periods of active gameplay. For example, user interaction with the input device(s) 112 may only be captured during periods of gameplay in which the pixels of the video data change at a certain rate and/or a certain quantity, such that user input during non-active or otherwise insignificant gameplay periods (e.g., paused game, menu screens, standby mode, rest, etc.) may be omitted from the analyzed user playstyle.

The display 108 may include any type of display capable of displaying the video (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs to the game. The input device(s) may include a keyboard, a mouse, a camera, a touch-screen display, a controller(s), a remote(s), a headset (e.g., sensors of a virtual or augmented reality headset), and/or other types of input devices.

The communication interfaces such as communication interface 110, may include one or more components and features for communicating across one or more networks, such as the network(s) 108. The communication interface(s) 110 may be configured to communicate via any number of network(s) 108, described herein. For example, to communicate in the system 100 of FIG. 1, the client devices 104 may use an Ethernet or Wi-Fi connection through a router to access the Internet in order to communicate with the recommendation server(s) 120, the game server(s) 102, and/or with other client devices 104.

The game server(s) 102 may include, among other things, a game engine 130, a communication interface 110, and/or one or more data store(s) 134. Although only a few components and/or features of the game server(s) 102 are illustrated in FIG. 1, this is not intended to be limiting. For example, the game server(s) 102 may comprise additional or alternative components, such as those described below with respect to the computing device 1100 of FIG. 11 and/or the data center 1200 of FIG. 12.

The game engine 130 may include one or more components and features for generating, distributing, and/or managing game data such as video streams, audio streams, game instances, and/or other types of data streams that may be used by a game streaming platform and presented in a client device(s) 104, such as in the display 114. Game data may be located on one or more data store(s) 134, retrieved by the game engine 130, and communicated over one or more network(s) 108 using a communication interface 110 to transmit game data to the recommendation server(s) 120 and/or client device(s) 104. As further examples, the game engine may receive the game data from one or more external devices, such as a client device 104, and relay the game data to one or more other external devices, such as one or more other client devices 104 or the recommendation server 120.

The recommendation server(s) 120 may include one or more servers for generating, training, managing, storing, and/or using components for determining and generating game recommendations. The recommendation server(s) 120 may include, among other things, a recommendation engine 140 and/or data store(s) 134. Although only a few components and/or features of the recommendation server(s) 120 are illustrated in FIG. 1, this is not intended to be limiting. For example, the recommendation server(s) 120 may include additional or alternative components, such as those described below with respect to the computing device 1100 of FIG. 11.

As further illustrated in FIG. 1, the recommendation server(s) 120 may be separate or distinct from the game server(s) 102 and/or a client device 104; however, this is not intended to be limiting. For example, the recommendation server(s) 120 may be the same or similar servers to the game server(s) 102 and/or one or more components thereof may be at least partially on a client device(s) 104. In some examples, the recommendation server(s) 120 may be operated or hosted by a first entity (e.g., a first company) and the game server(s) 102 may be operated or hosted by a second entity (e.g., a second, different company). In other examples, the recommendation server(s) 120 and the game server(s) 102 may be operated or hosted, at least partially, by the same entity.

The recommendation server(s) 120 may comprise the communication interface 110 that may include one or more components and features for communicating across one or more networks, such as the network(s) 108. The communication interface 110 may be configured to communicate via any number of network(s) 108, described herein. For example, to communicate in the system 100 of FIG. 1, the recommendation server(s) 120 may use an Ethernet or Wi-Fi connection through a router to access the Internet in order to communicate with the client device(s) 104, the game server(s) 102, and/or with other recommendation server(s) 120.

The recommendation server(s) 120 may include a recommendation engine 140 that is configured to generate a game recommendation based on playstyles associated with a game. In some embodiments, the recommendation engine 140 may include, among other things, a playstyle profiler 122, a similarity determiner 124, and/or a recommendation generator 126. In some examples, one or more recommendation engines 140 may be located on the recommendation server(s) 120 or may be located on the client device(s) 104. The recommendation server(s) 120 may include one or more data store(s) 134 in which playstyle profiles 136 may be stored and/or accessed.

The playstyle profiler 122 may be configured to generate, update, and/or manage personal and aggregate playstyle profiles associated with any number of games. The playstyle profiler 122 may use the analyzed playstyles corresponding to a number of different players to generate an aggregate playstyle profile associated with a particular game. For example, the aggregate playstyle profiler 122 may use playstyles that have been analyzed from a set of players of a particular game, such as analyzed by one or more playstyle analyzers 138 corresponding to one or more client device(s) 104. In some embodiments, the playstyle profiler 122 can use a set of analyzed playstyles to generate one or more playstyle profiles associated with a particular game that indicate a distribution of playstyles in relation to one or more playstyle attributes. For example, a playstyle profile, such as the example playstyle profiles 400 of FIG. 4, may be generated by the playstyle profiler 122.

The playstyle profiles generated by the playstyle profiler 122 may be stored in one or more data store(s) 134 and subsequently retrieved when the playstyle profiles are updated. For example the playstyle profiles 136 stored in the data store(s) 134 may be retrieved and updated by the playstyle profiler 122 to include newly analyzed playstyle information.

The similarity determiner 124 may comprise one or more components and features for calculating a similarity score for one or more games based on at least a playstyle attribute. For example, the similarity determiner 124 may compare a user's playstyle in a first game to an aggregate playstyle profile associated with a second game to determine a similarity score. In some embodiments, the similarity score may be provided to a recommendation generator 126, that may be configured to use the similarity scores corresponding to a list of games to determine which games may be used to generate a recommendation to a user.

Figure 2:
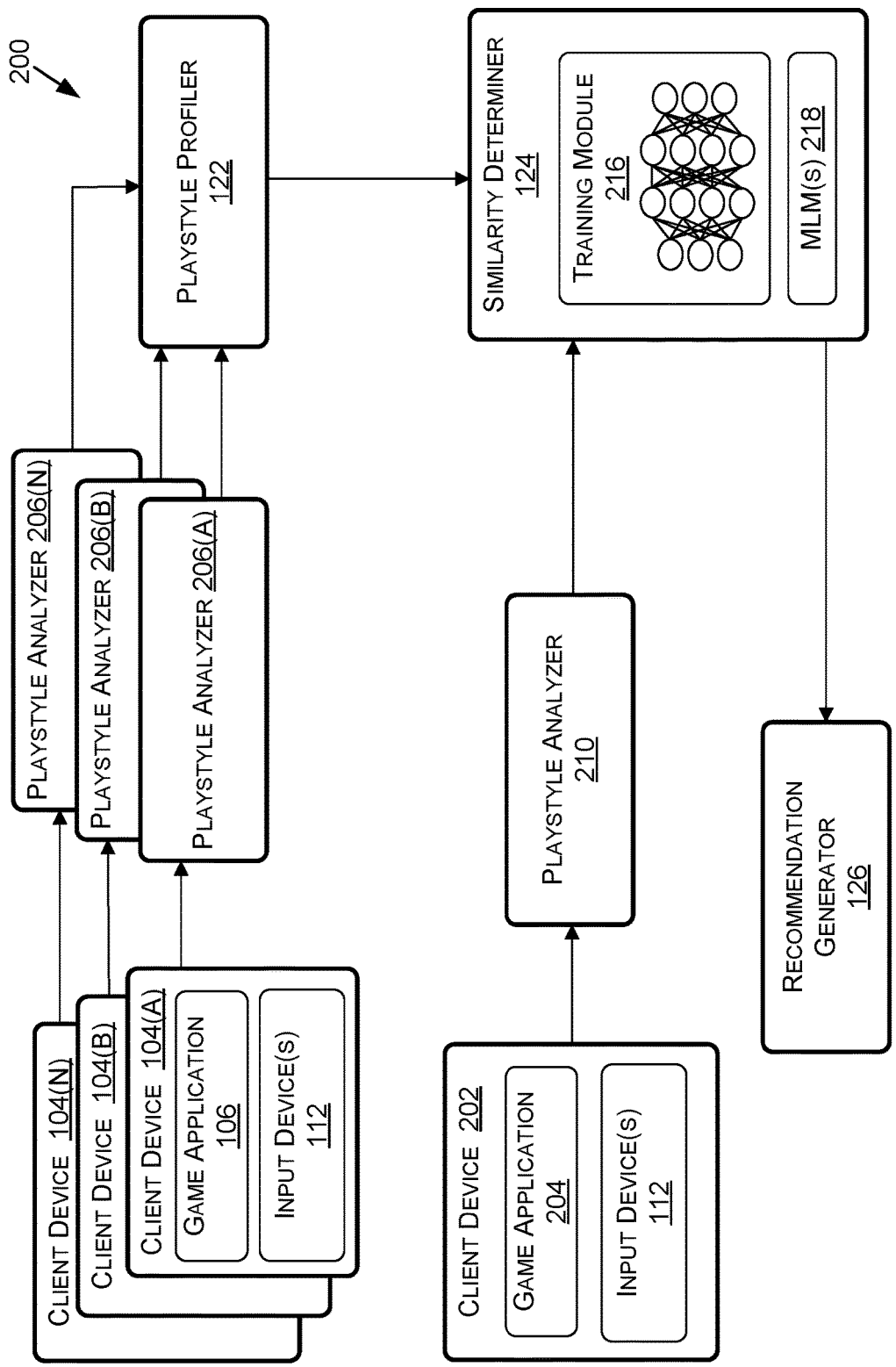
FIG. 2 is block diagram showing a process for generating a game recommendation based on user interactions, in accordance with some embodiments of the present disclosure.

The similarity determiner 124 may include one or more machine learning models (MLM(s)) that are trained, using a training module, to determine games that have a similar aggregate playstyle profile to a user's playstyle, and to determine a similarity score. The similarity determiner 124 may include a training module for learning a game playstyle profile based on user interactions with the game. For example, FIG. 2 depicts a similarity determiner 124 comprising a training module 216 and one or more MLM(s) 218. The training module may be used to train machine learning model(s) of any type, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptions, long/short terms memory, Hopfield, Boltzmann, deep belief, deconvolutional, generative adversarial, liquid state machine, etc.), twin neural networks, and/or other types of machine learning models.

The recommendation generator 126 may comprise one or more components and features for generating one or more game recommendations. For example, the recommendation generator 126 may use the similar scores calculated by the similarity determiner 124 to determine one or more games from a set of games to provide as a recommendation to a user. In some embodiments, the recommendation generator 126 may generate a game recommendation based on the similarity score calculated by comparing the aggregate playstyle profile of a first game to the aggregate playstyle profile of a second game. In some embodiments, the recommendation generator 126 may generate a game recommendation based the similarity score calculated by comparing the playstyle of a particular user in a first game to the aggregate playstyle profile of a second game generated based on user interactions of many users with the second game, or based on a similarity of a third game based on an interest level inferred from users with similar personal playstyles as the particular user.

The recommendation generator 126 may provide a game recommendation for a particular game having the highest similarity score. In some example, the recommendation generator 126 may determine a set of games to recommend. For instance, the recommendation generator 126 may generate a recommendation for the top 10 or top 25 games based on their respective similarity scores. In some embodiments, the recommendation generator 126 may determine a game recommendation based on a combination of similarity score and one or more additional game attributes. For example, the game recommendation may be based solely on the similarity score, or the game recommendation may be based on a combination of the similarity score and the additional game attributes such as genre, keywords, console compatibility, aesthetic, age rating, content rating, release date, theme, setting, expected time to completion, etc. In some embodiments, the game recommendation generated by the recommendation generator 126 may include one or more of a game feature, a game attribute, a game aesthetic, a genre, a game pace, or any other information related to the playstyle and/or gameplay of the recommend game. In some embodiments, the recommendation generator 126 may provide the one or more game recommendations to one or more client device(s) 104. For example, the recommendation generator 126 may use the network(s) 108 to transmit a game recommendation to a client device 104 for presentation in the display 114.

Now referring to FIG. 2, FIG. 2 is a block diagram showing a process 200 for generating a game recommendation based on user interactions, in accordance with some embodiments of the present disclosure. In some embodiments, client device(s) 104 may capture user interactions with the game application 106 corresponding to a first game. For example, each of client device of the client device(s) 104 may correspond to a different player of a plurality of players of a first game in a game application 106. In some embodiments, data representing the user interactions with the input device(s) 112 may be provided to one or more playstyle analyzers, such as playstyle analyzer 206(A), playstyle analyzer 206(B), and playstyle analyzer 206(N) (referred to collectively herein as "playstyle analyzers 206").

In some embodiments, the playstyle analyzers 206 may generate data that is representative of the user interaction of the plurality of players of the first game in the game application 106. For example, each playstyle analyzer of the playstyle analyzers 206 may generate data representative of the playstyle of a particular player of the first game. The generated playstyle data for each player of the first game in the plurality of players may be provided to a playstyle profiler 122.

In some embodiments, the playstyle profiler 122 may receive playstyle data corresponding to a plurality of players of a first game and combine them into an aggregate playstyle profile corresponding to the first game. In some embodiments, the playstyle profiler 122 can use a set of analyzed playstyles to generate one or more playstyle profiles associated with a particular game that indicate a distribution of playstyles in relation to one or more playstyle attributes. As discussed in more detail below in reference to FIG. 4, the playstyle profiles may be represented as a histogram, a probability distribution function (PDF), a cumulative distribution function (CDF), and/or another representation type that indicates how a set of users has interacted with the first game.

In some embodiments, client device 202 may capture a particular second user's interactions with the game application 202 corresponding to a second game that is distinct from the first game corresponding to game application 106. For example, data representing the second user's interactions with the input device(s) 112 may be provided to playstyle analyzer 210. The playstyle analyzer 210 may generate data that is representative of the second user's interaction with the second game in the game application 204. For example, the playstyle analyzer 210 may generate data representative of the playstyle of the second user for the second game.

The playstyle profile corresponding to the first game and the data representative of the playstyle of the second user for the second game may be provided to similarity determiner 124. As described in more detail above with respect to FIG. 1, the similarity determiner 124 may compare a user's playstyle in the second game to an aggregate playstyle profile associated with the first game to determine a similarity score.

The similarity determiner 124 may include a training module 216 for training the MLM(s) 218 to determine games that have a similar aggregate playstyle profile to a user's playstyle and determining a similarity score. Game data may be applied to the MLM(s) 218 by the training module 216, where the MLM(s) 218 learns to detect similarities between data representative of user interactions in a first game and data representative of user interaction in a second game. In some examples, the game data may be applied to one or more MLM(s) 218 (e.g., neural networks) to be trained using reinforcement learning or inverse reinforcement learning. For example, to learn to detect or identify patterns in playstyle data, inverse reinforcement learning may be used to learn playstyle attributes in any of a number of games.

The similarity determiner 124 may provide the calculated similarity scores to the recommendation generator 126. The recommendation generator 126 may use the similarity scores associated with the first game and the second game to determine whether the first game will be recommended to the user based on the user's playstyle in relation to the second game. For example, if the similarity score from the similarity determiner 124 satisfies a particular threshold, a recommendation may be provided to the user, such as through game application 204 of client device 202.

Figure 3:
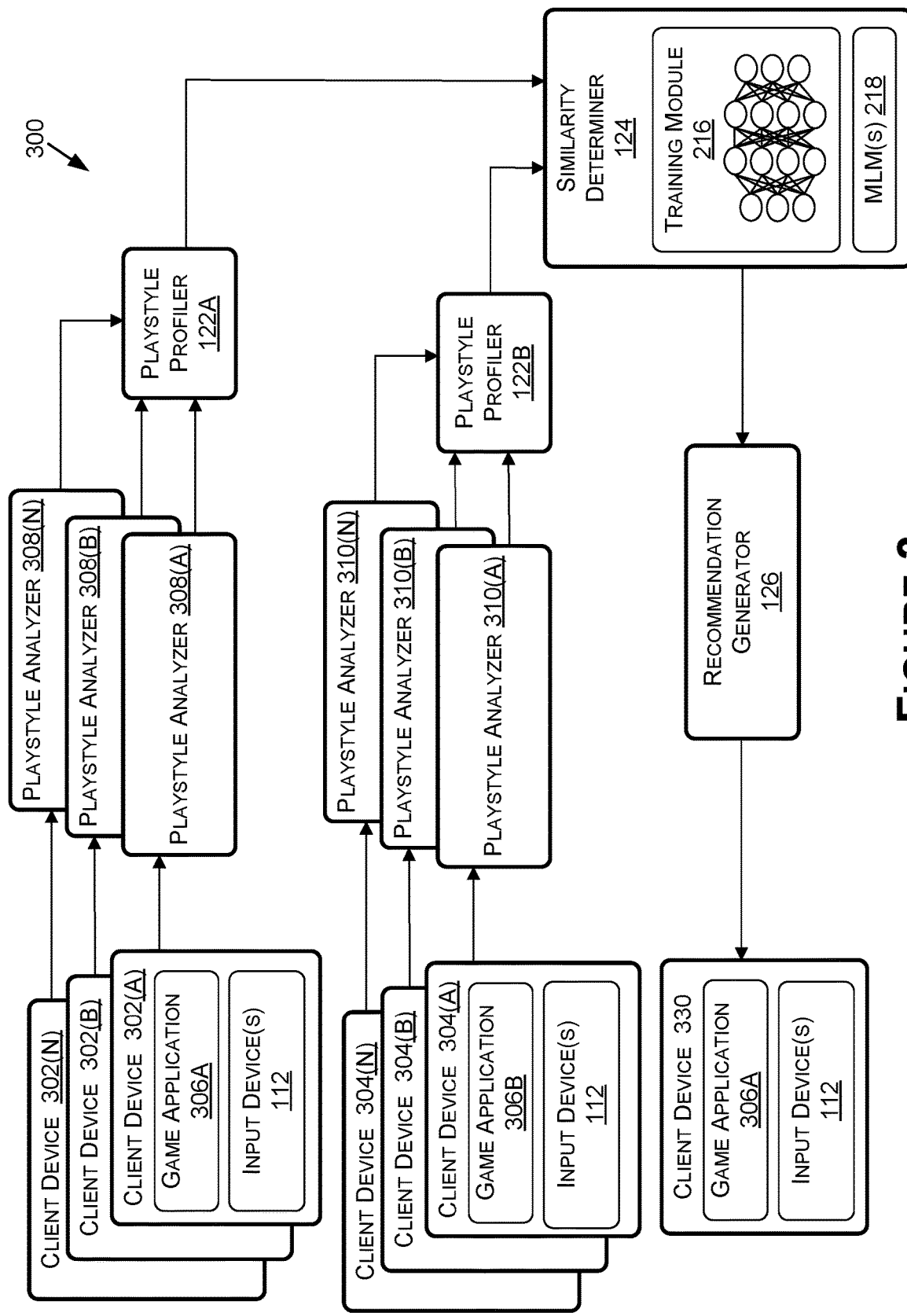
FIG. 3 is a block diagram showing a process for generating a game recommendation based on player interactions, in accordance with some embodiments of the present disclosure.

Now referring to FIG. 3, FIG. 3 is a block diagram showing a process for generating a game recommendation based on player interactions, in accordance with some embodiments of the present disclosure. In some embodiments, one or more client devices 302(A), 302(B), and 302(N) (referred to collectively herein as "client devices 302") may capture user interactions with the game application 306A corresponding to a first game. For example, each of client device of the client device(s) 302 may correspond to a different player of a plurality of players of a first game in a game application 306A. In some embodiments, data representing the user interactions with the input device(s) 112 may be provided to one or more playstyle analyzers, such as playstyle analyzer 308(A), playstyle analyzer 308(B), and playstyle analyzer 308(N) (referred to collectively herein as "playstyle analyzers 308").

In some embodiments, the playstyle analyzers 308 may generate data that is representative of the user interaction of the plurality of players of the first game in the game application 306A. For example, each playstyle analyzer of the playstyle analyzers 308 may generate data representative of the playstyle of a particular player of the first game. The generated playstyle data for each player of the first game in the plurality of players may be provided to a playstyle profiler 122A.

Similarly, one or more client devices 304(A), 304(B), and 304(N) (referred to collectively herein as "client devices 304") may capture user interactions with the game application 306B corresponding to a second game. For example, each of client device of the client device(s) 304 may correspond to a different player of a plurality of players of a second game in a game application 306B. In some embodiments, data representing the user interactions with the input device(s) 112 may be provided to one or more playstyle analyzers, such as playstyle analyzer 310 (A), playstyle analyzer 310(B), and playstyle analyzer 310 (N) (referred to collectively herein as "playstyle analyzers 310").

In some embodiments, the playstyle analyzers 310 may generate data that is representative of the user interaction of the plurality of players of the second game in the game application 306B. For example, each playstyle analyzer of the playstyle analyzers 310 may generate data representative of the playstyle of a particular player of the second game. The generated playstyle data for each player of the second game in the plurality of players may be provided to a playstyle profiler 122B.

In some embodiments, the playstyle profiler 122A and playstyle profiler 122B may receive playstyle data corresponding to a plurality of players of a first game and combine them into a playstyle profile corresponding to the first game and receive playstyle data corresponding to a plurality of players of a second game and combine them into a playstyle profile corresponding to the second game. The playstyle profiles corresponding to the first game and playstyle profiles corresponding to the second game may be provided to similarity determiner 124. As described in more detail above with respect to FIG. 1 and FIG. 2, the similarity determiner 124 may compare playstyle profile of the first game to the playstyle profile of the second game to determine a similarity score.

The similarity determiner 124 may provide the calculated similarity scores to the recommendation generator 126. The recommendation generator 126 may use the similarity scores associated with the first game and the second game to determine whether the second game will be recommended to a user associated with client device 330. In some embodiments, recommending the second game to the user associated with client device 330 may be based on first determining that the user has played or otherwise interacted with the first game. For example, if it is determined that the user has played the first game of game application 306A, and if the similarity score from the similarity determiner 124 satisfies a particular threshold, a recommendation for the second game may be provided to the user, such as through game application 306A of client device 330. This process may be repeated for any number of games, and the one or more games with the highest similarity may be recommended to the user.

Figure 4:
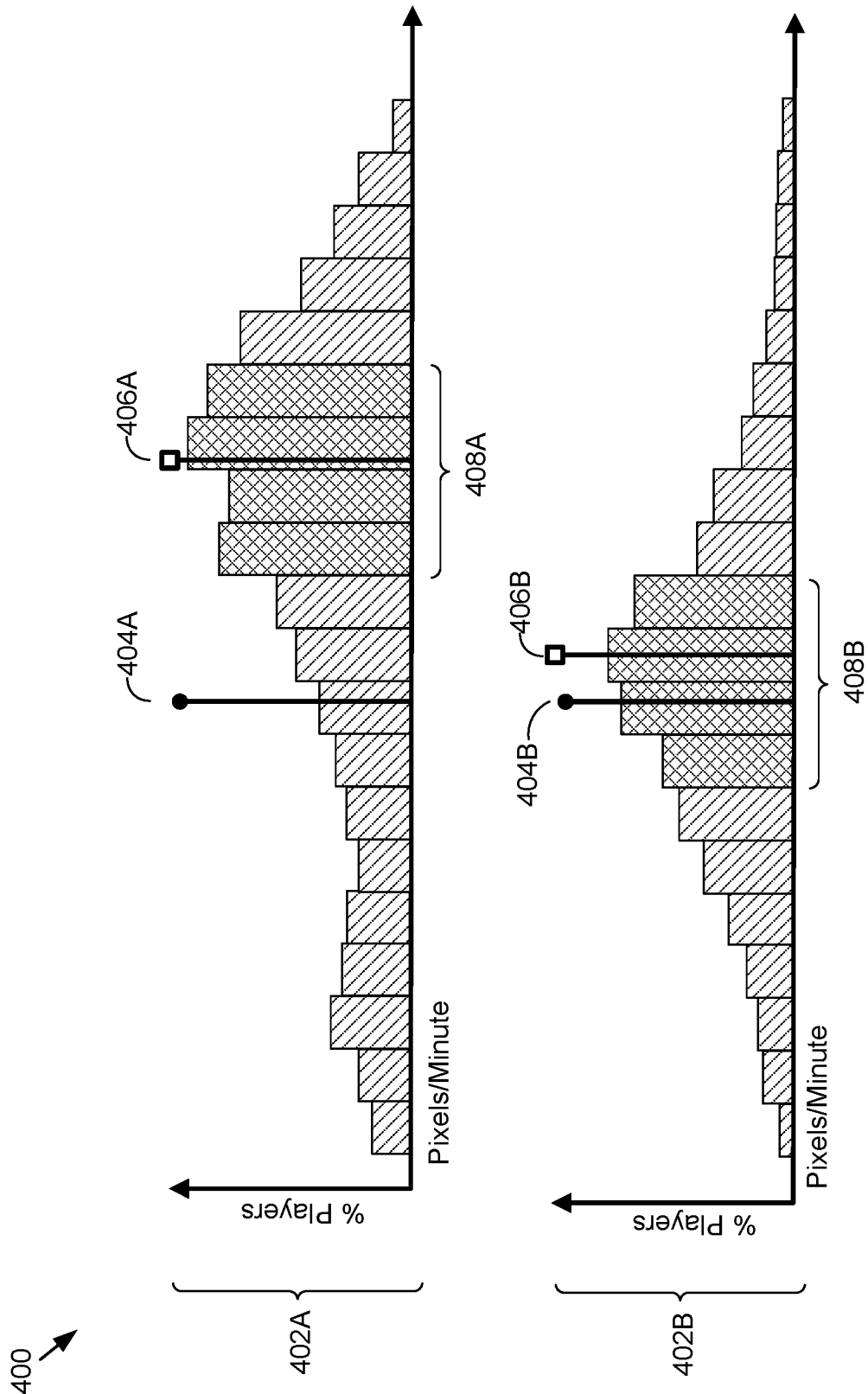
FIG. 4 is an example of playstyle profiles, in accordance with some embodiments of the present disclosure.

Now referring to FIG. 4, FIG. 4 depicts example playstyle profiles 400, in accordance with some embodiments of the present disclosure. The playstyle profiles may include data representative of user interactions with a game to generate one or more playstyle attributes for the game. For example, a playstyle attribute may be a value, parameter, and/or distribution that indicates the playstyle of the users associated with the data representative of user interactions. The playstyle profiles 400 may be presented as a histogram, probability distribution function (PDF), cumulative distribution function (CDF), and/or using another representation type that represents how a set of users has interacted with a game. For example, playstyle histogram 402A and playstyle histogram 402B indicate the analyzed playstyle for a set of players of a game. In playstyle histogram 402A and playstyle histogram 402B indicated the percentage of players that have various values of user interactions that have been analyzed as pixels moved per minute. While FIG. 4, depicts playstyle histogram 402A and playstyle histogram 402B as histograms of the playstyle attribute of pixels/minute, this is not intended to be limiting, and any of a number of other representations and/or playstyle attribute combinations are contemplated herein.

The playstyle histogram 402A and playstyle histogram 402B may also indicate a portion of the respective distributions that correspond to the playstyle attributes of a particular percentile or deviation of all players in a set of players of a game. For example, playstyle deviation 408A and playstyle deviation 408B may indicate 50% of all players of a game have been determined to have a playstyle associated with the respective portions of playstyle histogram 402A and playstyle histogram 402B. The playstyle histogram 402A and playstyle histogram 402B may also include an indication of an average value for a playstyle attribute for the set of players of a game, such as the mean playstyle 406A and mean playstyle 406B, corresponding to playstyle histogram 402A and playstyle histogram 402B respectively.

In some embodiments, the playstyle histogram 402A and playstyle histogram 402B may include an indication of the determined playstyle associated with a particular user for a first game. For example the user playstyle 404A and user playstyle 404B may indicate a value corresponding to one or more playstyle attributes that is representative of the user's interactions with the first game. In some embodiments, the user playstyle may be compared to the mean playstyle, average playstyle, and/or the playstyle deviation to determine a similarity score between a user's playstyle and the collective playstyle of a set of players of a different second game. For example, user playstyle 404A may be compared to mean playstyle 406A and/or playstyle deviation 408A to determine a similarity between a user's playstyle in a first game and the playstyle of other players in a second game. In the example of playstyle histogram 402A, it may be determined that the user's playstyle indicated by user playstyle 404A has a low degree of similarity to the playstyle of other players of a second game, since the user playstyle 404A falls outside of the playstyle deviation 408A. In another example of playstyle histogram 402B, it may be determined that the user's playstyle indicated by user playstyle 404B has a high degree of similarity to the playstyle of other players of a second game, since the user playstyle 404B falls within the playstyle deviation 408B. Thus, the game corresponding to playstyle histogram 402B may be recommended to the user, while the game corresponding to playstyle histogram 402A may not be recommended to the user.

Figure 5:
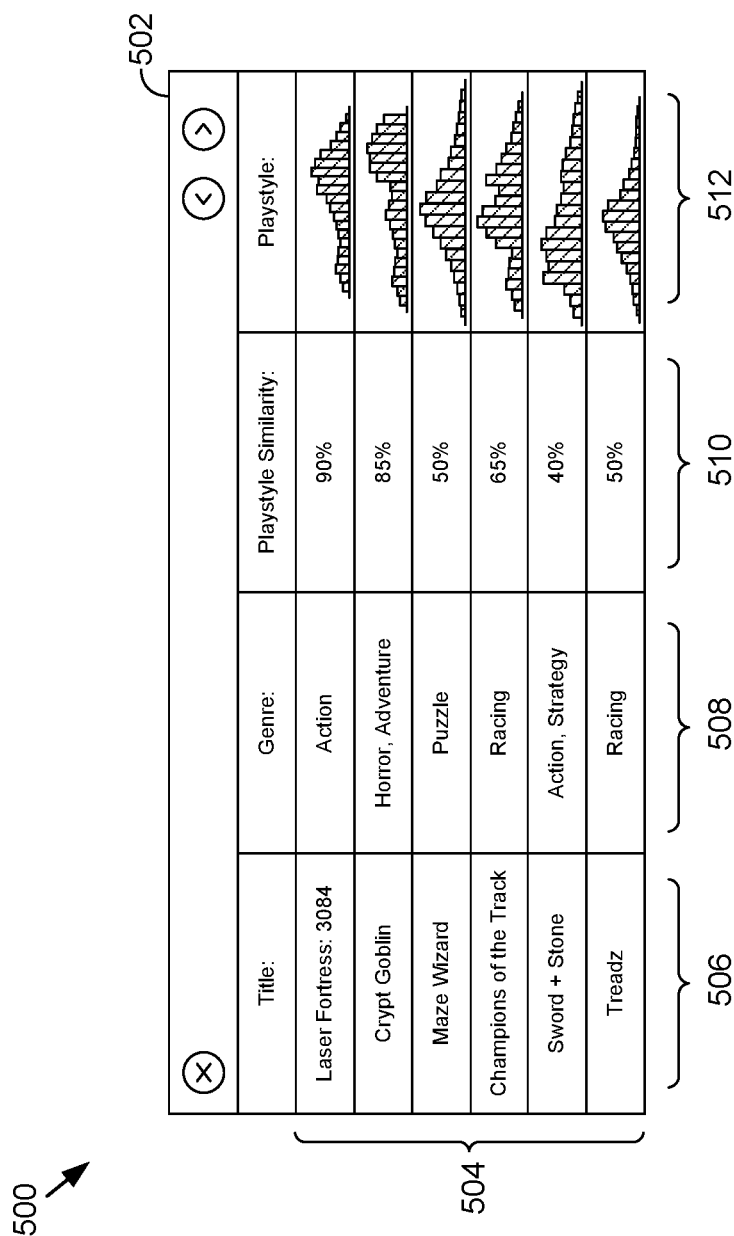
FIG. 5 is an example screenshot from a graphical user interface for game recommendations, in accordance with some embodiments of the present disclosure.

Now referring to FIG. 5, FIG. 5 is an example screenshot from a graphical user interface (GUI) 500 for game recommendations, in accordance with some embodiments of the present disclosure. The GUI 500 as shown in FIG. 5 may be part of a larger GUI. For example the GUI 500 as shown may be a GUI region or window presented within an enclosing GUI. In some embodiments, the GUI 500 may be part of or presented with the game application 106 of the client device(s) 104. For example, the GUI 500 may be presented in the display 114 of the client device(s) 104. As further examples, the GUI 500 may be part of or presented with applications other than the game application 106. Further, the GUI 500 may be presented on a client device(s) 104 that is different from a client device(s) 104 used for analyzing gameplay of a user.

The GUI 500 may present a user with a game recommendation list 502 that may be associated with a number of recommended games. For example, the GUI 500 may present to a user a list of game recommendations 504. In some examples, the list of game recommendations 504 may represent a ranked list of game titles. For example, the GUI 500 may present a number of games that best match the playstyle of a user.

The game recommendation list 502 may include any information associated with the list of game recommendations 504. For example the information may include the game titles 506 of recommended games, additional game attributes 508, a playstyle similarity scores 510, and/or aggregate playstyle profiles 512 associated with the list of game recommendations.

In some embodiments, the additional game attributes 508 may include any additional information associated with a recommended game. For example, the additional game attributes 508 may include genre, keywords, release date, console compatibility, aesthetic, age rating, content rating, release date, theme, setting, expected time to completion, etc. In some embodiments, the additional game attributes 508 may be used to determine game to recommend. In some embodiments the additional game attributes 508 may be presented in association to recommended games, though the additional game attributes 508 may not have served as a basis on which the recommended games were identified.

In some embodiments, the playstyle similarity scores 510 may indicate the degree of similarity between a user's analyzed playstyle in a first game, and the aggregate playstyle profiles 512 of a set of other players of the different games in the game recommendation list 502. For example, the playstyle similarity scores 510 may be indicated as a numeric score, a level of match (e.g., high, medium, low, etc.), and/or any suitable method of indicating a similarity between the user playstyle and the aggregate playstyle profiles 512. As an example, the playstyle similarity scores 510 is depicted in FIG. 5 as a percent match between a first game associated with the playstyle of a user and the aggregate playstyle profiles 512 of a set of other players of the different games in the game recommendation list 502. In the example GUI 500 of FIG. 5, the playstyle similarity scores 510 depict a "90%" match between a user's playstyle and playstyle profile of the aggregate playstyle profiles 512 corresponding to the game, "Laser Fortress: 3084," and depicting a "40%" match between a user's playstyle and a playstyle profile of the aggregate playstyle profiles 512 corresponding to the game, "Sword+Stone." Thus, the game "Laser Fortress: 3084," may be a more suitable game to provide to the user based on the playstyle similarity scores 510.

In some embodiments, the GUI 500 may include playstyle profiles 512 that provide an indication of the playstyles of a set of players of the various games in the game recommendation list 502. For example the playstyle profiles 512 may be displayed in accordance to example playstyle profiles 400 described above in reference to FIG. 4.

Figure 6:
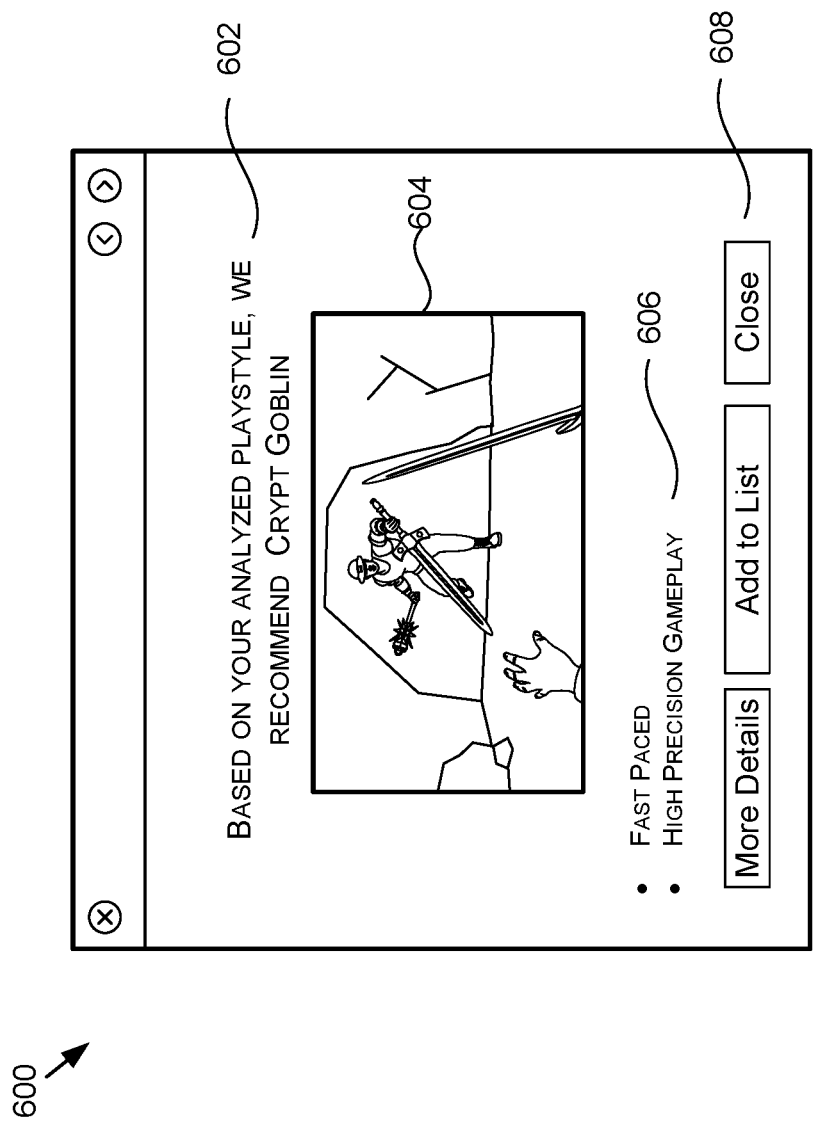
FIG. 6 is an example screenshot from a graphical user interface for a game recommendation, in accordance with some embodiments of the present disclosure.

Now referring to FIG. 6, FIG. 6 is an example screenshot from a graphical user interface (GUI) 600 for a game recommendation, in accordance with some embodiments of the present disclosure. The GUI 600 as shown in FIG. 6 may be part of a larger GUI. For example the GUI 600 as shown may be a GUI region or window presented within an enclosing GUI. In some embodiments, the GUI 600 may be part of or presented with the game application 106 of the client device(s) 104. For example, the GUI 600 may be presented in the display 114 of the client device(s) 104. As further examples, the GUI 600 may be part of or presented with applications other than the game application 106. Further, the GUI 600 may be presented on a client device(s) 104 that is different from a client device(s) 104 used for analyzing gameplay of a user.

The GUI 600 may present a user with recommendation information 602 that may be associated with a recommended game. For example, the GUI 600 may prompt a user with the recommendation information 602, such as recommending the game title "Crypt Goblin." The recommendation information 602 may include any information associated with the recommended game. For example, the recommendation information 602 may include the name of a recommended game with an indication that the recommended game is being recommended based on a detected or analyzed playstyle associated with the user.

In some embodiments, the GUI 600 may include playstyle information 606 that indicates characteristics of a user's playstyle that were considered to recommend the recommended game. The playstyle information 606 may include a game feature, game attributes, game aesthetic, genre, game pace, or any other information related to the playstyle and/or gameplay of the recommend game. For example, the playstyle information 606 may indicate that the recommended game reflects a "Fast Paced" quality and a "High Precision Gameplay" playstyle.

In at least one embodiment, the GUI 600 may contain a region that presents a game depiction(s) 604, which may include graphical elements representative of the recommended game. For example, the game depiction(s) 604 may include an image, video, and/or audio associated with the recommended game. An image and/or other information presented regarding a recommended game may be captured by be stored locally or retrieved from a data store. For example, each game depiction(s) 604 may be retrieved from one or more data stores 134. In some cases, the game depiction(s) 604 may include a video or series of image frames. For example, the GUI 600 may present a portion of gameplay video or a video trailer from the recommended game.

In some embodiments, the GUI 600 may include a graphical element(s) 608 that is enables a number of actions related to the recommended game. The graphical element(s) 608 may be selectable to allow a user to access additional details about a recommended game, add the recommended game to a saved game list or cart, and/or play or otherwise acquire the recommended game. For example, the graphical element 608 may be selectable by a user to add the recommended game "Crypt Goblin" to a list associated with the user.

Figure 7:
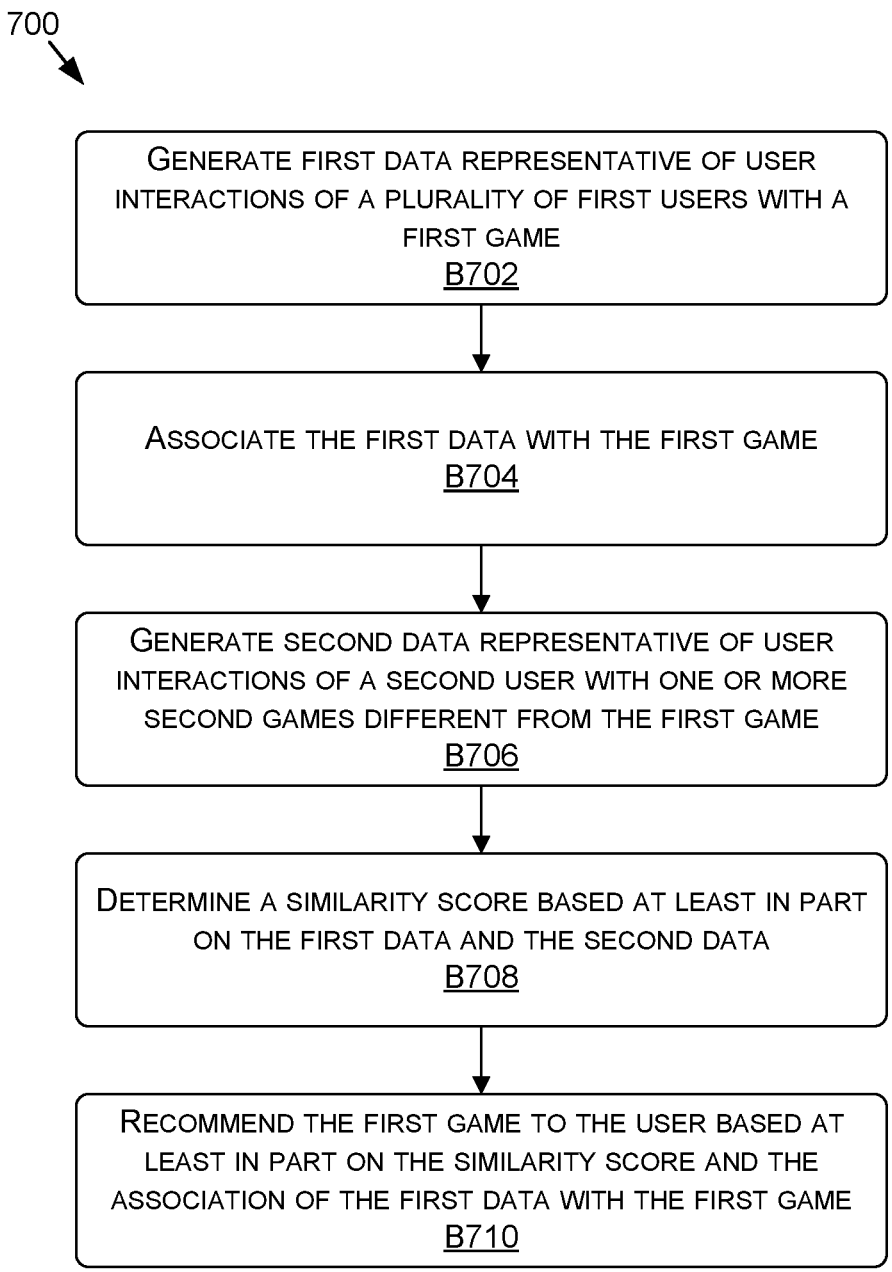
FIG. 7 is a flow diagram showing a method for generating a game recommendation, in accordance with some embodiments of the present disclosure.
Figure 8:
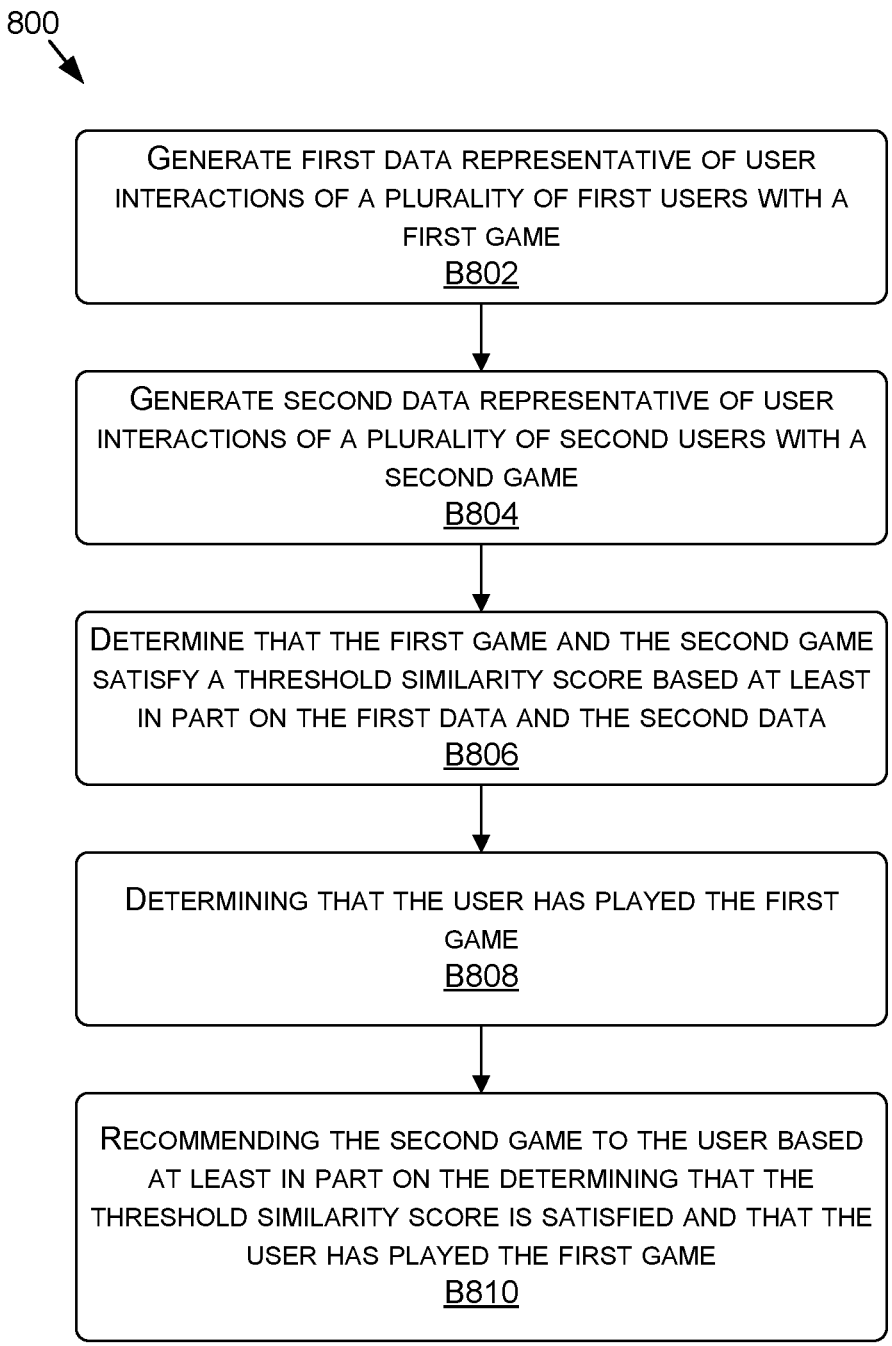
FIG. 8 is a flow diagram showing a method for generating a game recommendation, in accordance with some embodiments of the present disclosure.
Figure 9:
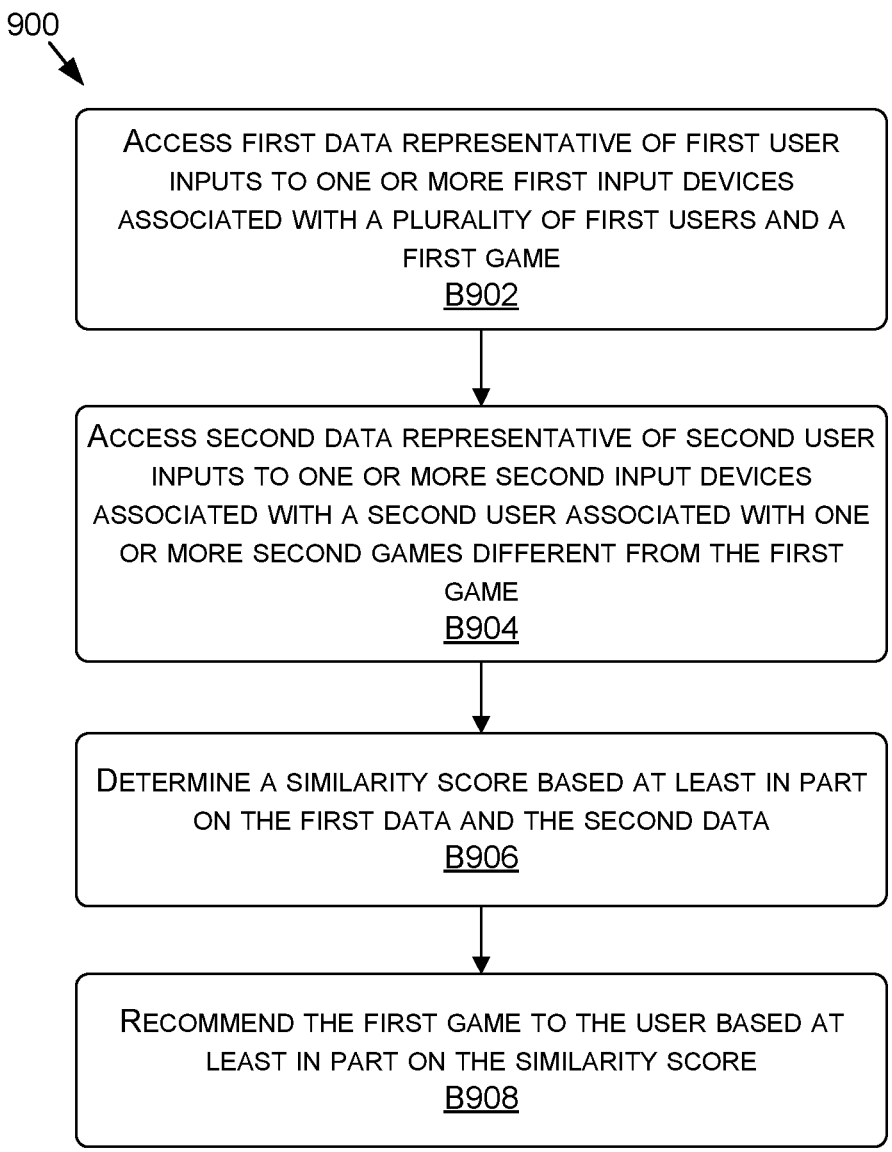
FIG. 9 is a flow diagram showing a method for generating a game recommendation, in accordance with some embodiments of the present disclosure.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods 700, 800, and 900 may also be embodied as computer-usable instructions stored on computer storage media. The methods 700, 800, and 900 may be provided by a standalone application, a service or hosted service (standalone or in combination with another hosted service), or a plug-in to another product, to name a few. In addition, the methods 700, 800, and 900 are described, by way of example, with respect to the system of FIG. 1. However, these methods may additionally or alternatively be executed by any one system, or any combination of systems, including, but not limited to, those described herein.

With reference to FIG. 7, FIG. 7 is a flow diagram showing a method 700 for generating a game recommendation, in accordance with some embodiments of the present disclosure. The method 700, at block B702, includes generating first data representative of user interactions of a plurality of first users with a first game. For example, the playstyle analyzer 138 may use data from the input device(s) 112 to generate data that is representative of a user's interactions with the game application 106 of the client device 104A.

The method 700, at block B704, includes associating the first data with the first game. For example, the playstyle analyzer 138 may associate the data from input device(s) 112 with a first game played by a user of the game application 106. The first data may represent the playstyle of the user with respect to the first game.

The method 700, at block B706, includes generating second data representative of user interactions of a second user with one or more second games different from the first game. For example, the recommendation server(s) 120 may use the recommendation engine 140 to generate an aggregate playstyle profile for one or more second games. The recommendation engine 140 may use the playstyle profiler 122 to generate the aggregate playstyle profiles for the one or more second games.

The method 700, at block B708, includes determining a similarity score based at least in part on the first data and the second data. For example, the similarity determiner 124 of the recommendation engine 140 may compare the first data corresponding to the user and the second data corresponding to the aggregate playstyle profiles for the one or more second games.

The method 700, at block B710, includes recommending the first game to the user based at least in part on the similarity score and the association of the first data with the first game. For example, the recommendation generator 126 may use similarity scores from the similarity determiner 124 to determine that the first game should be recommended. The first game may be provided to the user through the display 114 of the client device(s) 104.

Now referring to FIG. 8, FIG. 8 is a flow diagram showing a method 800 for generating a game recommendation, in accordance with some embodiments of the present disclosure. The method 800, at block B802, includes generating first data representative of user interactions of a plurality of first users with a first game. For example, the playstyle analyzer 138 of the client device(s) 104 may use data from the input device(s) 112 to generate data that is representative of interactions of a plurality of first users of a first game with the game application 106.

The method 800, at block B804, includes generating second data representative of user interactions of a plurality of second users with a second game. For example, the playstyle analyzer 138 of the client device(s) 104 may use data from the input device(s) 112 to generate data that is representative of interactions of a plurality of second users of a second game with the game application 106.

The method 800, at block B806, includes determining that the first game and the second game satisfy a threshold similarity score based at least in part on the first data and the second data. For example, the similarity determiner 124 of the recommendation engine 140 may be used to compare the first data representative of user interactions of a plurality of first users with a first game to the second data representative of user interactions of a plurality of second users with a second game. The similarity determiner 124 may apply a threshold to the calculated similarity scores.

The method 800, at block B808, includes determining that the user has played the first game. For example, the client device(s) 104 may be searched to determine if the user owns or has run the game application 106 associated with the first game. The game server(s) 102 may access the game engine 130 and/or the data store(s) 134 to check if the user has run the first game.

The method 800, at block B810, includes recommending the second game to the user based at least in part on the determining that the threshold similarity score is satisfied and that the user has played the first game. For example, the recommendation generator 126 may generate a game recommendation for the second game based on receiving a similarity score from the similarity determiner 124 that satisfies the threshold similarity score. The recommendation of the second game may be provided to the client device(s) 104 and presented in display 114.

Now referring to FIG. 9, FIG. 9 is a flow diagram showing a method 900 for generating a game recommendation, in accordance with some embodiments of the present disclosure. The method 900, at block B902, includes accessing first data representative of first user inputs to one or more first input devices associated with a plurality of first users and a first game. For example, similarity determiner 124 may retrieve the first data representative of first user inputs to one or more first input devices associated with a plurality of first users and a first game from the data store(s) 134 of the recommendation server(s) 120 and/or the game server(s) 102.

The method 900, at block B904, includes accessing second data representative of second user inputs to one or more second input devices associated with a second user associated with one or more second games different from the first game. For example, the similarity determiner 124 may retrieve the second data representative of second user inputs to one or more second input devices associated with a plurality of second users and a second game from the data store(s) 134 of the recommendation server(s) 120 and/or the game server(s) 102.

The method 900, at block B906, includes determining a similarity score based at least in part on the first data and the second data. For example, the recommendation engine 140 may use the similarity determiner 124 to calculate a similarity score that represents the similarity between the first data and the second data.

The method 900, at block B908, includes recommending the first game to the user based at least in part on the similarity score. For example, the recommendation generator 126 of the recommendation engine 140 may use the similarity scores from the similarity determiner 124 to generate a game recommendation recommending the first game to the user. In particular, the client device(s) 104 may provide the recommendation of the first game to the user using the display 114.

Example Content Streaming System

Figure 10:
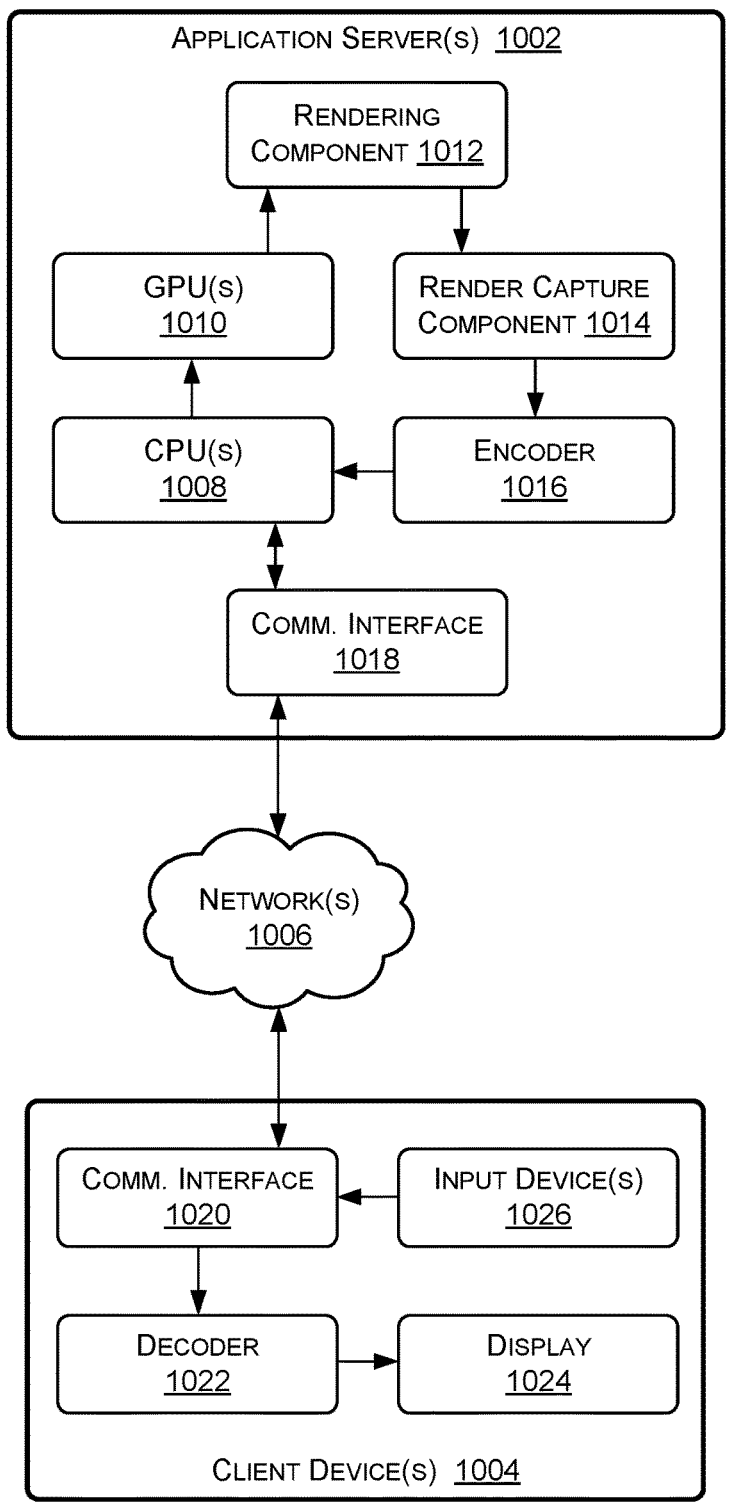
FIG. 10 is a block diagram of an example content streaming system suitable for use in implementing some embodiments of the present disclosure.

Now referring to FIG. 10, FIG. 10 is an example system diagram for a content streaming system 1000, in accordance with some embodiments of the present disclosure. FIG. 10 includes application server(s) 1002 (which may include similar components, features, and/or functionality to the example computing device 1100 of FIG. 11), client device(s) 1004 (which may include similar components, features, and/or functionality to the example computing device 1100 of FIG. 11), and network(s) 1006 (which may be similar to the network(s) described herein). In some embodiments of the present disclosure, the system 1000 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 1000, for an application session, the client device(s) 1004 may only receive input data in response to inputs to the input device(s), transmit the input data to the application server(s) 1002, receive encoded display data from the application server(s) 1002, and display the display data on the display 1024. As such, the more computationally intense computing and processing is offloaded to the application server(s) 1002 (e.g., rendering—in particular ray or path tracing—for graphical output of the application session is executed by the GPU(s) of the game server(s) 1002). In other words, the application session is streamed to the client device(s) 1004 from the application server(s) 1002, thereby reducing the requirements of the client device(s) 1004 for graphics processing and rendering.

For example, with respect to an instantiation of an application session, a client device 1004 may be displaying a frame of the application session on the display 1024 based on receiving the display data from the application server(s) 1002. The client device 1004 may receive an input to one of the input device(s) and generate input data in response. The client device 1004 may transmit the input data to the application server(s) 1002 via the communication interface 1020 and over the network(s) 1006 (e.g., the Internet), and the application server(s) 1002 may receive the input data via the communication interface 1018. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 1012 may render the application session (e.g., representative of the result of the input data) and the render capture component 1014 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 1002. In some embodiments, one or more virtual machines (VMs)—e.g., including one or more virtual components, such as vGPUs, vCPUs, etc.—may be used by the application server(s) 1002 to support the application sessions. The encoder 1016 may then encode the display data to generate encoded display data and the encoded display data may be transmitted to the client device 1004 over the network(s) 1006 via the communication interface 1018. The client device 1004 may receive the encoded display data via the communication interface 1020 and the decoder 1022 may decode the encoded display data to generate the display data. The client device 1004 may then display the display data via the display 1024.

Example Computing Device

Figure 11:
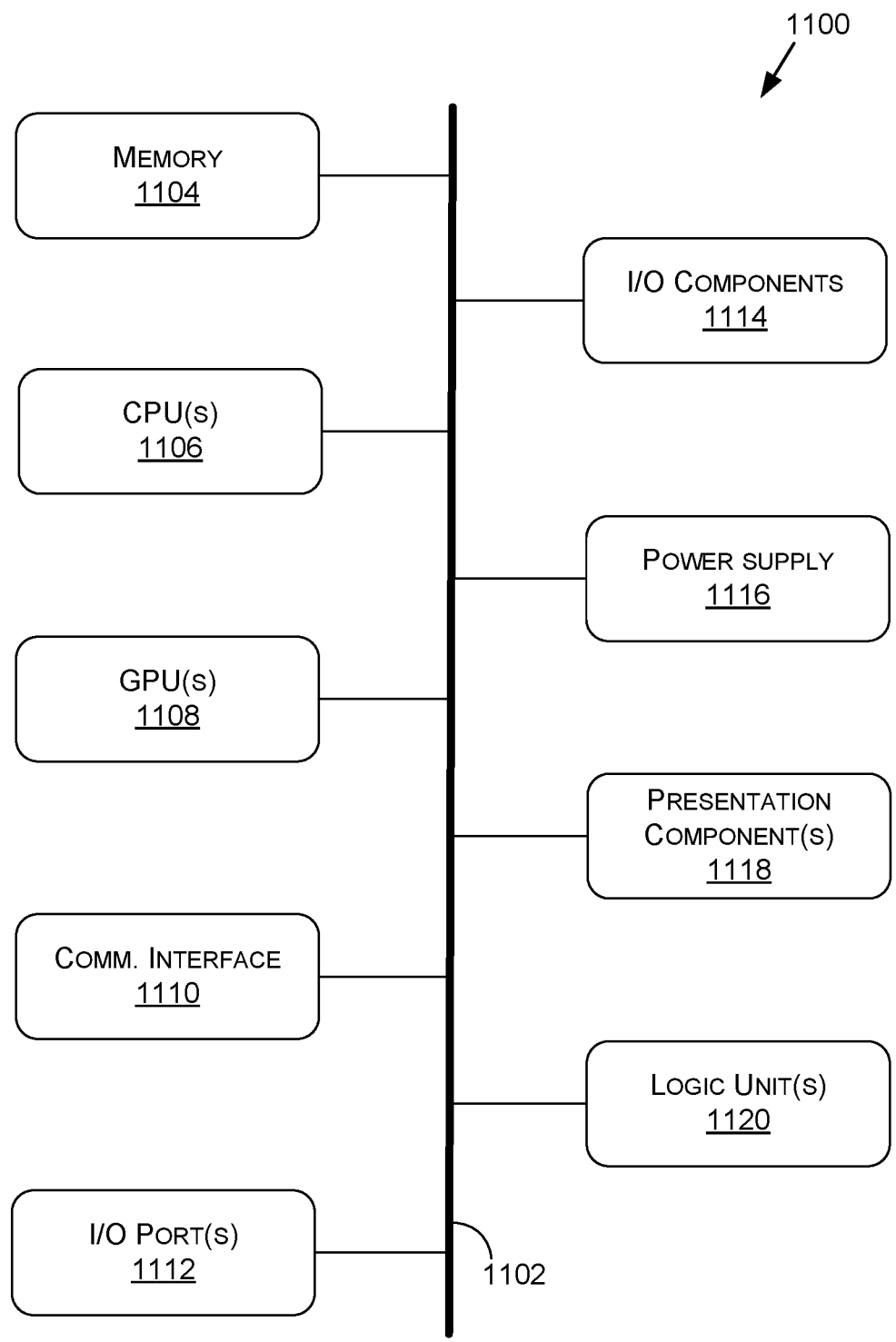
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
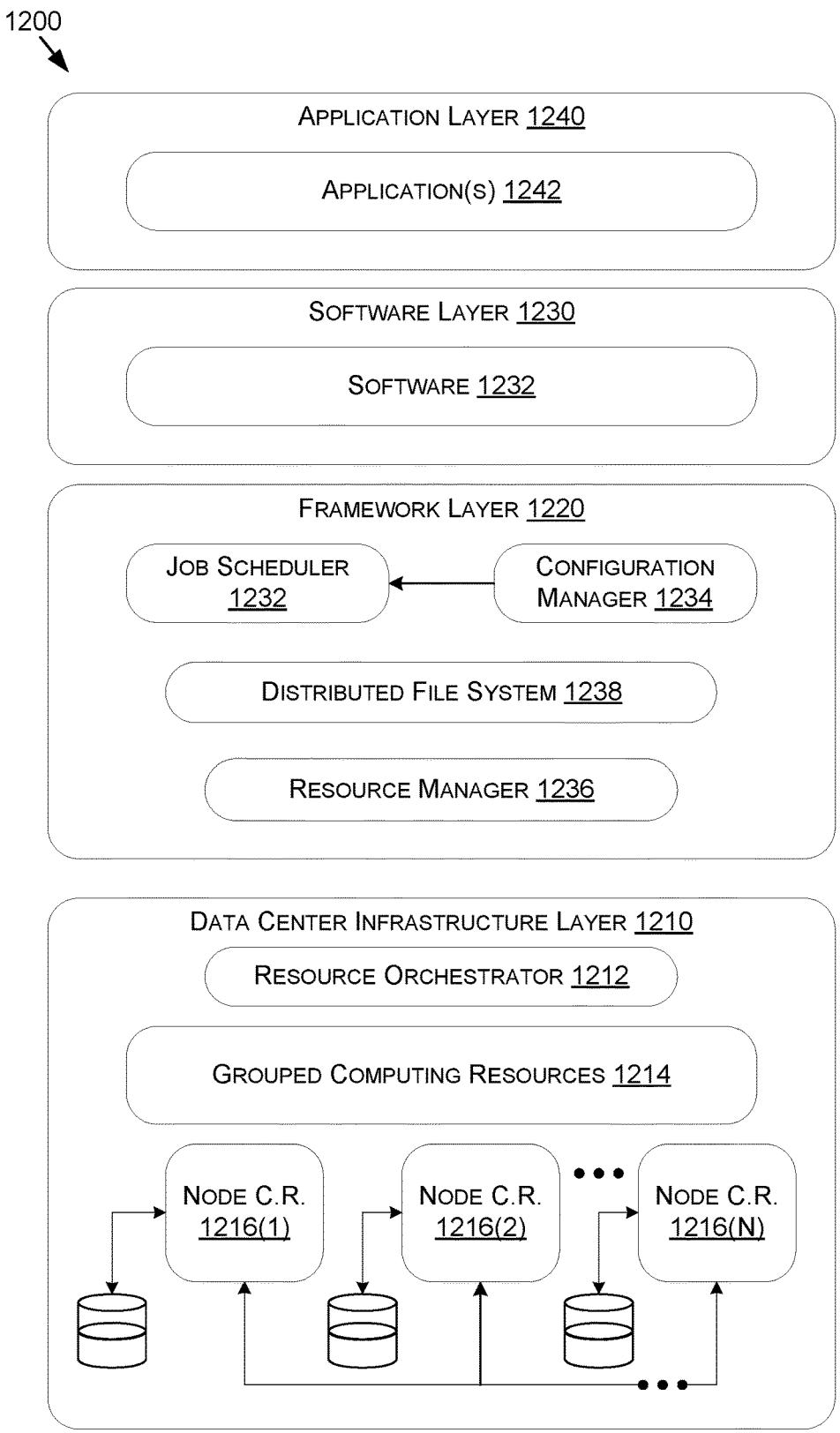
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1232, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1232 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1232. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
generate a first representation of user behavior corresponding to a plurality of first users during one or more first instances of a first game, the first representation including a representation of at least a first pace of user inputs corresponding to the plurality of first users during the one or more first instances;
associate the first representation with the first game;
generate a second representation of user behavior corresponding to a second user during one or more second instances of one or more second games different from the first game, the second representation including a representation of at least a second pace of user inputs corresponding to the second user during the one or more second instances;
determine a similarity score based at least on the first representation and the second representation, the similarity score corresponding to an amount of difference between the first pace and the second pace; and
recommend the first game to the second user based at least on the similarity score and the association of the first representation with the first game.

2. The processor of claim 1, wherein the first pace is computed based at least on analyzing the user inputs corresponding to the plurality of first users or an output of an application responsive to the user inputs.

3. The processor of claim 2, wherein the first pace represents a frequency of the user inputs corresponding to the plurality of first users.

4. The processor of claim 1, wherein the first pace represents a rate of pixel movement computed across frames corresponding to the user inputs corresponding to the plurality of first users.

5. The processor of claim 1, wherein the determining of the similarity score is based at least on comparing the first pace to the second pace.

6. The processor claim 1, wherein the determining the similarity score includes
computing, using a machine learning model and based at least on the first representation and the second representation, the similarity score.

7. The processor of claim 1, wherein the recommendation is further based at least on one or more game attributes associated with the first game and the one or more second games.

8. The processor of claim 7, wherein the one or more game attributes include at least of a genre, a console compatibility, a game aesthetic, an age rating, a content rating, a release date, a theme, a setting, or an expected time to completion.

9. The processor of claim 1, wherein the representation of the first pace comprises a distribution of the first pace of the user inputs corresponding to the plurality of first users and the determining of the similarity score is based at least on comparing the second pace to the distribution of the first pace.

10. The processor of claim 1, wherein the processor is comprised in at least one of:
a system for performing deep learning operations;
a system implemented using an edge device;
a system implemented using a local computing device;
a system incorporating one or more virtual machines (VMs);
a system implemented at least partially in a data center;
a system implemented using an online store;
a system implemented using a collaborative content creation platform for multi-dimensional assets; or
a system implemented at least partially using cloud computing resources.

11. A system comprising:
one or more processing units to execute operations comprising:
generating a first representation of user behavior corresponding to a plurality of first users during one or more first instances of a first game, the first representation including a representation of at least a first pace of user inputs corresponding to the plurality of first users during the one or more first instances;
generating a second representation of user behavior corresponding to a plurality of second users during one or more second instances of a second game, the second representation including a representation of at least a second pace of user inputs corresponding to the second user during the one or more second instances;
determining that the first game and the second game satisfy a threshold similarity score based at least on the first representation and the second representation, the threshold similarity score corresponding to an amount of difference between the first pace and the second pace;
determining that a user has played the first game; and
recommending the second game to the user based at least on the determining that the threshold similarity score is satisfied and that the user has played the first game.

12. The system of claim 11, wherein the system is comprised in at least one of:
a system for performing deep learning operations;
a system implemented using an edge device;
a system implemented using a local computing device;
a system incorporating one or more virtual machines (VMs);
a system implemented at least partially in a data center;
a system implemented using an online store;
a system implemented using a collaborative content creation platform for multi-dimensional assets; or
a system implemented at least partially using cloud computing resources.

13. The system of claim 11, wherein the first pace is computed from representations of the user inputs corresponding to the plurality of first users.

14. The system of claim 11, wherein the recommending the second game is further based at least on one or more game attributes associated with the first game and the second game, wherein the one or more game attributes include a genre, console compatibility, a game aesthetic, an age rating, a content rating, a release date, a theme, a setting, or an expected time to completion.

15. The system of claim 11, wherein the representation of the first pace is computed using results of the user inputs corresponding to the plurality of first users, wherein the results of the user inputs include a change in pixel values across frames.

16. The system of claim 11, wherein the first pace corresponds to a frequency of the user inputs corresponding to the plurality of first users.

17. The system of claim 11, wherein the determining that the first game and the second game satisfy the threshold similarity score includes
comparing the representation of the first pace to the representation of the second pace to generate a similarity score, and comparing the similarity score to the threshold similarity score.

18. A method comprising:
accessing a first representation of user behavior corresponding to a plurality of users during one or more first instances of a first game, the first representation including a representation of at least a first pace of user inputs corresponding to the plurality of users during the one or more first instances;
accessing a second representation of user behavior corresponding to a second user during one or more second instances of one or more second games different from the first game, the second representation including a representation of at least a second pace of user inputs corresponding to the second user during the one or more second instances;
determining a similarity score based at least on the first representation and the second representation, the similarity score corresponding to an amount of difference between the first pace and the second pace; and
recommending the first game to the second user based at least on the similarity score.

19. The method of claim 18, wherein the first pace corresponds to at least one of a frequency associated with the user inputs corresponding to the plurality of users, a speed component associated with the user inputs, or a directional component associated with the user inputs.

20. The method of claim 18, wherein the determining the similarity score includes comparing game attributes associated with the first game to game attributes associated with the one or more second games.

* * * * *